(12) United States Patent
Tanaka

(10) Patent No.: US 9,475,951 B2
(45) Date of Patent: *Oct. 25, 2016

(54) WATER-BASED INK FOR INK-JET RECORDING, INK CARTRIDGE AND METHOD FOR PRODUCING WATER-BASED INK FOR INK-JET RECORDING

(71) Applicant: Brother Kogyo Kabushiki Kaisha, Nagoya-shi, Aichi-ken (JP)

(72) Inventor: Hiroyuki Tanaka, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,290

(22) Filed: Mar. 16, 2015

(65) Prior Publication Data

US 2015/0275006 A1 Oct. 1, 2015

(30) Foreign Application Priority Data

Mar. 28, 2014 (JP) .................................. 2014-070559

(51) Int. Cl.
| | | |
|---|---|---|
| C09D 11/30 | (2014.01) | |
| C09D 11/328 | (2014.01) | |
| C08K 5/42 | (2006.01) | |
| C08K 5/06 | (2006.01) | |
| C08K 5/11 | (2006.01) | |
| C08K 5/12 | (2006.01) | |
| C08K 5/1535 | (2006.01) | |
| C08K 5/092 | (2006.01) | |

(52) U.S. Cl.
CPC ............... *C09D 11/328* (2013.01); *C08K 5/06* (2013.01); *C08K 5/092* (2013.01); *C08K 5/11* (2013.01); *C08K 5/12* (2013.01); *C08K 5/1535* (2013.01); *C08K 5/42* (2013.01)

(58) Field of Classification Search
CPC .............................. C09D 11/30; C09D 11/328
See application file for complete search history.

(56) References Cited

U.S. PATENT DOCUMENTS

| 5,565,022 A * | 10/1996 | Wickramanayake .. C09D 11/30 106/31.25 |
|---|---|---|
| 5,952,414 A | 9/1999 | Noguchi et al. |
| 8,016,404 B2 | 9/2011 | Kato et al. |
| 8,394,185 B2 | 3/2013 | Ezaki et al. |
| 2008/0241398 A1 | 10/2008 | Kato et al. |
| 2010/0180795 A1* | 7/2010 | Ezaki .................... C09D 11/36 106/31.13 |
| 2013/0021406 A1 | 1/2013 | Stoeva et al. |
| 2013/0305958 A1* | 11/2013 | Birecki ................ C09D 7/1291 106/31.25 |
| 2014/0036010 A1* | 2/2014 | Hasegawa ............ C09D 11/102 347/86 |
| 2015/0275011 A1* | 10/2015 | Tanaka ................. C09D 11/023 347/86 |

FOREIGN PATENT DOCUMENTS

| JP | H09111165 A | 4/1997 |
|---|---|---|
| JP | 2005-219372 A | 8/2005 |
| JP | 2007-224079 A | 9/2007 |
| JP | 2008-246821 A | 10/2008 |
| JP | 2010-168455 A | 8/2010 |

OTHER PUBLICATIONS

Jan. 2016—(US) Final Office Action—U.S. Appl. No. 14/671,166.
Mar. 27, 2015—(US) Co-pending U.S. Appl. No. 14/671,166.
Sep. 1, 2015—(US) Non-Final Action—U.S. Appl. No. 14/671,166.

* cited by examiner

*Primary Examiner* — Veronica F Faison
(74) *Attorney, Agent, or Firm* — Banner & Witcoff, Ltd.

(57) ABSTRACT

A water-based ink for ink-jet recording contains a water-soluble colorant; water; and a water-insoluble liquid which is dispersed in the water and of which boiling point is not less than 250 degrees Celsius. The water-based ink may further contain a surfactant. The drying property of the water-based ink is improved and any odor can be lowered.

14 Claims, 2 Drawing Sheets

WATER-BASED INK FOR INK-JET RECORDING, INK CARTRIDGE AND METHOD FOR PRODUCING WATER-BASED INK FOR INK-JET RECORDING

CROSS REFERENCE TO RELATED APPLICATION

The present application claims priority from Japanese Patent Application No. 2014-070559 filed on Mar. 28, 2014 the disclosure of which is incorporated herein by reference in its entirety.

BACKGROUND OF THE INVENTION

1. Field of the Invention

The present invention relates to a water-based ink for ink-jet recording, an ink cartridge and a method for producing a water-based ink for ink jet recording.

2. Description of the Related Art

In the recent years, accompanying with the improvement in recording speed, it is desired to improve a so-called drying property for allowing an ink landed on a recording medium to quickly permeate into the recording medium so as to accelerate drying of the ink on the recording medium. For the purpose of improving the drying property, Japanese Patent Application Laid-open No. H09-111165 discloses that dipropylene glycol monopropyl ether (DPP) is added to a water-based ink.

In the water-based ink added with the DPP, however, the DPP is volatilized and an odor is emitted. In view of this situation, an object of the present teaching is to provide a water-based ink for ink-jet recording which has an improved drying property while suppressing the generation of odor.

SUMMARY OF THE INVENTION

According to a first aspect of the present teaching, there is provided a water-based ink for ink-jet recording including: a water-soluble colorant; water; and a water-insoluble liquid which is dispersed in the water, and of which boiling point is not less than 250 degrees Celsius.

In the water-based ink for ink-jet recording of the present teaching, since the water-insoluble liquid of which boiling point is not less than 250 degrees Celsius is dispersed in the water, it is possible to realize both the improvement in drying property and reduction of odor in the water-based ink. Further, according to the water-based ink for ink-jet recording of the present teaching, it is also possible to suppress any unevenness in a printed matter and to suppress any increase in the viscosity of water-based ink, as will be described later on.

According to a second aspect of the present teaching, there is provided a method for producing a water-based ink for ink-jet recording, the method including: a first liquid preparation step of preparing a first liquid by mixing and agitating a water-soluble colorant and water; a second liquid preparation step of preparing a second liquid by mixing and agitating the water, a surfactant, and a water-insoluble liquid of which boiling point is not less than 250 degrees Celsius; and a water-based ink preparation step of preparing the water-based ink for ink-jet recording by mixing and agitating the first liquid and the second liquid.

DESCRIPTION OF THE PREFERRED EMBODIMENTS

Figure 1A:
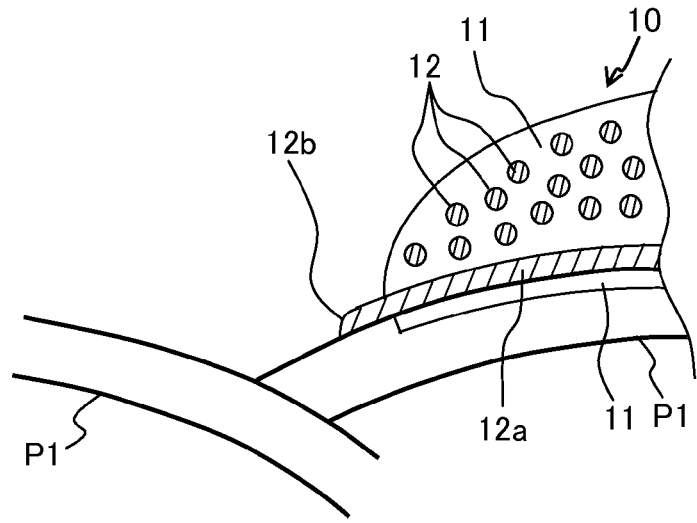
FIG. 1A is a conceptual view for explaining a presumed mechanism of improving the drying property in the present teaching, and depicts a state that a water-based ink has landed on a recording paper.

An explanation will be given about a specific example of a water-based ink for ink-jet recording of the present teaching. The water-based ink for ink-jet recording is also referred as "water-based ink" or "ink" in some cases. The water-based ink of the present teaching includes a water-soluble colorant, water and a water-insoluble liquid as will be described later on.

The water-soluble colorant can be exemplified, for example, by a dye, etc. The dye is not particularly limited and can be exemplified, for example, by direct dye, acid dye, basic dye, reactive dye, etc. More specifically, the dye may be exemplified by Color Index (hereinafter referred to as C. I.) Direct Black, C.I. Direct Blue, C.I. Direct Red, C.I. Direct Yellow, C.I. Direct Orange, C.I. Direct Violet, C.I. Direct Brown, C.I. Direct Green; C.I. Acid Black, C.I. Acid Orange, C.I. Acid Violet; C.I. Basic Black, C.I. Basic Blue, C.I. Basic Red, C.I. Basic Violet; C.I. Food Black; etc. The C.I. Direct Black is exemplified, for example, by C. I. Direct Black 17, 19, 32, 51, 71, 108, 146, 154, 168, etc. The C.I. Direct Blue is exemplified, for example, by C. I. Direct Blue 6, 22, 25, 71, 86, 90, 106, 199, etc. The C.I. Direct Red is exemplified, for example, by C. I. Direct Red 1, 4, 17, 28, 83, 227, etc. The C.I. Direct Yellow is exemplified, for example, by C.I. Direct Yellow 12, 24, 26, 86, 98, 132, 142, 173, etc. The C.I. Direct Orange is exemplified, for example, by C. I. Direct Orange 34, 39, 44, 46, 60, etc. The C.I. Direct Violet is exemplified, for example, by C. I. Direct Violet 47, 48, etc. The C.I. Direct Brown is exemplified, for example, by C. I. Direct Brown 109, etc. The C.I. Direct Green is exemplified, for example, by C. I. Direct Green 59, etc. The C.I. Acid Black is exemplified, for example, by C. I. Acid Black 2, 7, 24, 26, 31, 52, 63, 112, 118, etc. The C.I. Acid Blue is exemplified, for example, by C. I. Acid Blue 9, 22, 40, 59, 90, 93, 102, 104, 117, 120, 167, 229, 234, etc. The C.I. Acid Red is exemplified, for example, by C. I. Acid Red 1, 6, 32, 37, 51, 52, 80, 85, 87, 92, 94, 115, 180, 256, 289, 315, 317, etc. The C.I. Acid Yellow is exemplified, for example, by C. I. Acid Yellow 11, 17, 23, 25, 29, 42, 61, 71, etc. The C.I. Acid Orange is exemplified, for example, by C. I. Acid Orange 7, 19, etc. The C.I. Acid Violet is exemplified, for example, by C. I. Acid Violet 49, etc. The C.I. Basic Black is exemplified, for example, by C.I. Basic Black 2, etc. The C.I. Basic Blue is exemplified, for example, by C.I. Basic Blue 1, 3, 5, 7, 9, 24, 25, 26, 28, 29, etc. The C.I. Basic Red is exemplified, for example, by C. I. Basic Red 1, 2, 9, 12, 13, 14, 37, etc. The C.I. Basic Violet is exemplified, for example, by C. I. Basic Violet 7, 14, 27, etc. The C.I. Food Black is exemplified, for example, by C. I. Food Black 1, 2, etc.

The blending amount of the water-soluble colorant in the entire amount of the water-based ink is not particularly limited, and the blending amount is, for example, in a range of 0.5% by weight to 8% by weight, preferably in a range of 0.5% by weight to 5% by weight, and more preferably in a range of 2% by weight to 4% by weight.

The water is preferably ion-exchanged water or pure water (purified water). The blending amount of the water (water ratio) in the entire amount of the water-based ink is, for example, in a range of 10% by weight to 90% by weight, and preferably in a range of 40% by weight to 80% by weight. The water ratio may be, for example, the balance of the other components.

In the water-based ink of the present teaching, a water-insoluble liquid is present dispersed in the water. It is allowable, for example, that the water-insoluble liquid is present as emulsion (oil droplet-in-water type emulsion) in the water-based ink. In this case, although a micell is formed by the water-insoluble liquid, the water-soluble colorant is preferably present in the water as a dispersive medium, rather than in the micell.

The boiling point of the water-insoluble liquid is not less than 250 degrees Celsius. In the water-based ink of the present teaching, the reduction of odor can be realized by using the water-insoluble liquid which has a low volatility and of which boiling point is not less than 250 degrees Celsius (hereinafter referred to as a "specific water-insoluble liquid").

Figure 1B:
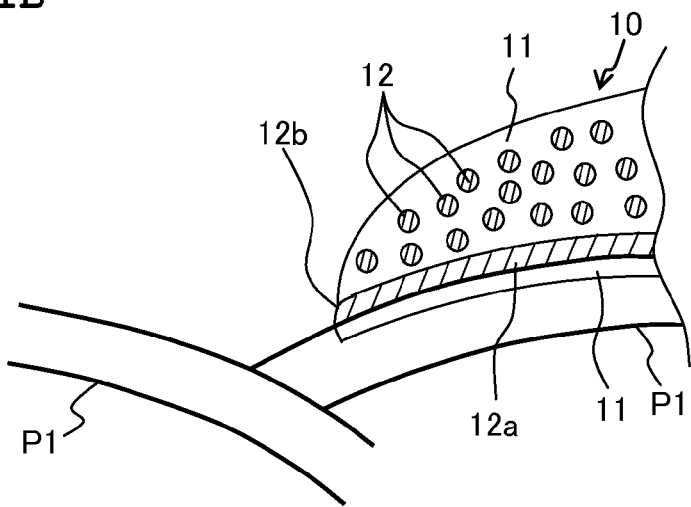
FIG. 1B is a conceptual view depicting the behavior of the water-based ink, following the state depicted in FIG. 1A.
Figure 1C:
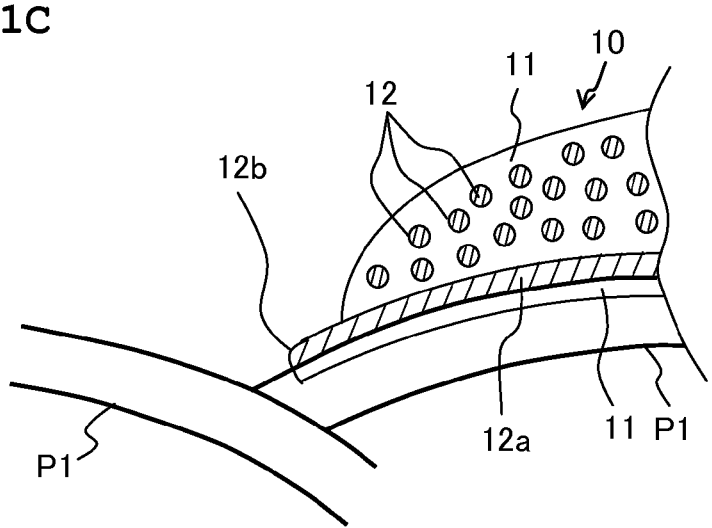
FIG. 1C is a conceptual view depicting the behavior of the water-based ink, following the state depicted in FIG. 1B.

Further, according to the present teaching, the drying property of the water-based ink can also be improved by dispersing the specific water-insoluble liquid in the water. With reference to FIGS. 1A to 1C, an explanation will be given about a presumed mechanism of improving the drying property in the present teaching, with a case that the recording medium is paper (recording paper) as an example. In a case that the water-based ink is discharged by an ink-jet system onto a recording paper, at first, a droplet of the water-based ink (ink droplet) lands on a fiber P1 of the recording paper (hereinafter referred to as "paper fiber P1"). FIG. 1A conceptually depicts an ink droplet 10 landed on the paper fiber P1. Although a specific water-insoluble liquid 12 is present in the landed ink droplet 10 as liquid droplets dispersed therein, in a process that water 11 of the ink droplet 10 permeates into the paper fiber P1 and the paper fiber P1 swells, the liquid droplet of the specific water-insoluble liquid 12 is burst or split to cover the surface of the paper fiber P1 as indicated by a reference numeral "12a" in FIG. 1A. With this, the dispersion state of the specific water-insoluble liquid 12 is dissolved. Since the surface tension (see TABLE 1 as follows) of the specific water-insoluble liquid 12 is lower than the surface tension of water (72 mN/m), the specific water-insoluble liquid 12 moves along (rolling on) the surface of the paper fiber P1, so as to project from the outer peripheral portion of the ink droplet 10, as indicated by a reference numeral "12b" in FIG. 1A. Namely, the specific water-insoluble liquid 12 moves so as to spread on the surface of the paper fiber P1 more quickly than the water 11 of the ink droplet 10. Next, as depicted in FIG. 1B, the water 11 of the ink droplet 10 catches up the forward end portion 12b of the specific water-insoluble liquid 12 covering the surface of the paper fiber P1, and the water 11 permeates into the paper fiber P1 below the forward end portion 12b. Next, as depicted in FIG. 1C, in a similar manner as the behavior depicted in FIG. 1A, when water 11 of the ink droplet 10 permeates into the paper fiber P1, the liquid droplet of the specific water-insoluble liquid 12 is burst to cover the surface of the paper fiber P1 as indicated by a reference numeral "12a" in FIG. 1C as a portion (forward end portion) of the specific water-insoluble liquid 12, and the forward end portion 12b of the specific water-insoluble liquid 12 moves so as to spread on the surface of the paper fiber P1 more quickly than the water 11 of the ink droplet 10. Then, the behaviors depicted in FIGS. 1A to 1C are repeated to thereby allow the water-based ink to permeate in the paper while quickly spreading on the paper fiber P1, without remaining on the paper fiber P1, thus allowing the ink droplet 10 landed on the paper to be dried easily. Note that, however, the above-described mechanism is merely a presumption, and the present teaching is not limited to and restricted by this presumed mechanism.

In some cases, the water-based ink of the present teaching appears to be muddy to some extent in a state before the water-based ink is discharged by the ink-jet system, since the specific water-insoluble liquid is dispersed. However, when the water-based ink is landed on the recording medium, the dispersion state of the specific water-insoluble liquid is no longer maintained as described above, and the muddy appearance of the water-based ink has also disappeared. Further, according to the present teaching, the water-based ink permeates into the recording medium more uniformly accompanying with the improvement in the permeability of the water-based ink, and thus it is also possible to achieve an additional effect such that any unevenness in a recorded matter is suppressed.

Conventionally, a water-soluble organic solvent has been used to improve the permeability of the water-based ink. However, since the water-soluble organic solvent has a relatively high viscosity, which in turn increases the viscosity of the water-based ink as well, there is such a fear that any discharge failure of the ink might be caused. The water-based ink of the present teaching uses the water-insoluble solvent, rather than using the water soluble organic solvent, for the purpose of improving the permeability. Accordingly, since the water as the main solvent of the water-based ink is not mixed with the water-insoluble liquid, it is also possible to suppress any increase in the viscosity of the water-based ink. Note that in a case of using, as the water-soluble organic solvent, a DPP of which molecular weight is relatively low for the purpose of maintaining the viscosity of the water-based ink to be relatively low, the above-described problem of odor is caused.

The specific water-insoluble liquid can be exemplified, for example, by diethyl adipate, diethyl phthalate, polypropylene glycol (PPG). The molecular weight of polypropylene glycol is preferably greater than 200 and not more than 2,000, more preferably not less than 400 and not more than 2,000. The surface tension of the specific water-insoluble liquid is preferably not less than 30 mN/m. By using the specific water-insoluble liquid of which surface tension is not less than 30 mN/m, the adaptability between the specific water-insoluble liquid and the water is improved, thereby further enhancing the permeability, and consequently making it possible to further enhance the drying property. Note that, however, in a case that the surface tension of the specific water-insoluble liquid is extremely high, it is difficult for the specific water-insoluble liquid to quickly disperse in accordance with the above-described mechanism, and thus the surface tension of the specific water-insoluble liquid is preferably not more than 60 mN/m. The boiling point, the surface tension and the structural formula of the specific water-insoluble liquid are indicated in Table 1 and Formulae (1) to (3), as follows.

TABLE 1

| Specific water-insoluble liquid | Diethyl adipate | Diethyl phthalate | PPG 400 |
|---|---|---|---|
| Boiling point (° C.) | 251 | 296 | 273< |
| Surface tension (mN/m) | 32 | 38 | 33 |
| Structural formula | Formula (1) | Formula (2) | Formula (3) |

[Formula 1]

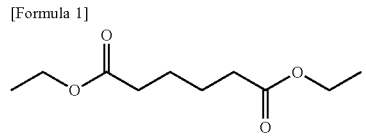

(1)

[Formula 2]

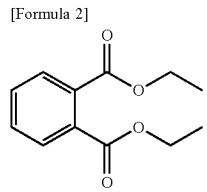

(2)

Formula [3]

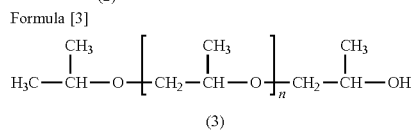

(3)

The specific water-insoluble liquid is preferably a substance having a polypropylene glycol structure such as the PPG 400 (Formula (3)). By using the specific water-insoluble liquid having the polypropylene glycol structure, it is possible to obtain a water-based ink with which any unevenness in a printer matter is further suppressed. On the other hand, a substance having a diester structure such as the diethyl adipate (Formula (1)) and the diethyl phthalate (Formula (2)) have an advantage of being inexpensive. The specific water-insoluble liquid is not limited to the above-described diethyl adipate, diethyl phthalate and polypropylene glycol (PPG) 400. Any substance may be used as the specific water-insoluble liquid provided that the substance satisfies the following conditions of being dispersible in water; being water-insoluble; and having a boiling point of not less than 250 degrees Celsius. Liquid paraffin used in a comparative example (to be described later on) is water-insoluble and has a boiling point exceeding 250 degrees Celsius, but does not easily disperse in water. Thus, the liquid paraffin is not considered as the specific water-insoluble liquid of the present teaching.

The blending amount of the specific water-insoluble liquid (specific water-insoluble liquid ratio) in the entire amount of the water-based ink is, for example, in a range of 1% by weight to 30% by weight, preferably in a range of 2% by weight to 20% by weight, and more preferably in a range of 4% by weight to 15% by weight. Considering suppressing the increase in viscosity of the water-based ink, the specific water-insoluble liquid ratio is preferably in a range of 1% by weight to 10% by weight. On the other hand, considering suppressing the unevenness in printer matter, the specific water-insoluble liquid ratio is preferably in a range of 10% by weight to 15% by weight.

In the water-based ink of the present teaching, the weight ratio of the water and the specific water-insoluble liquid is preferably in a range of water:specific water-insoluble liquid=60:1 to 1:1, more preferably in a range of water:specific water-insoluble liquid=30:1 to 2:1, further more preferably in a range of water:specific water-insoluble liquid=15:1 to 8:3.

The water-based ink of the present teaching further contains a surfactant. It is preferable that the specific water-insoluble liquid is dispersed in the water by the surfactant. Although the surfactant is not particularly limited, the surfactant is exemplified, for example, by a polyoxyalkylene alkyl ether-based surfactant, a sorbitan-based surfactant, a sorbit-based surfactant, etc.

The polyoxyalkylene alkyl ether-based surfactant is exemplified, for example, by polyoxyethylene alkyl ether, polyoxypropylene alkyl ether, etc. It is also allowable to use, for example, any commercially available product as the polyoxyalkylene alkyl ether-based surfactant. The commercially available product is exemplified, for example, by "EMULGEN (trade name) 408" (polyoxyethylene oleyl ether), "EMULGEN (trade name) 105" (polyoxyethylene lauryl ether), "EMULGEN (trade name) 150" (polyoxyethylene lauryl ether), "EMULGEN (trade name) 220" (polyoxyethylene cetyl ether), "EMULGEN (trade name) 306P" (polyoxyethylene stearyl ether), "EMULGEN (trade name) 404" (polyoxyethylene oleyl ether), "EMULGEN (trade name) 430" (polyoxyethylene oleyl ether), "EMULGEN (trade name) 705" (polyoxyethylene alkyl ether), etc., which are produced by KAO CORPORATION.

The sorbitan-based surfactant is exemplified, for example, by a surfactant represented by the following formula (4), etc.

[Formula 4]

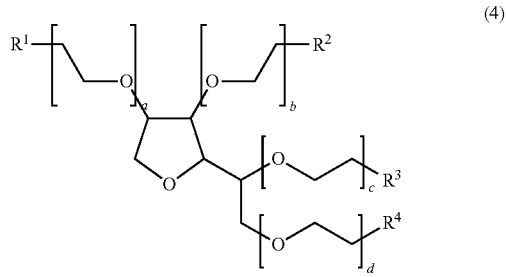

(4)

In the formula (4), each of $R^1$, $R^2$, $R^3$ and $R^4$ is a hydroxyl group, or a saturated or unsaturated fatty acid of which carbon atom number is 12 to 18; and "a", "b", "c" and "d" may be identical to one another or different from one another, and are numbers satisfying: $a+b+c+d \geq 20$.

The saturated or unsaturated fatty acid of which carbon atom number is 12 to 18 is exemplified, for example, by lauric acid, myristic acid, palmitic acid, stearic acid, palmitoleic acid, oleic acid, ricinoleic acid, linoleic acid, etc., and is preferably the lauric acid, stearic acid and oleic acid. Further, in the formula (4), it is preferable that $20 \leq a+b+c+d \leq 160$.

It is allowable to use, for example, any commercially available product as the sorbitan-based surfactant. The commercially available product is exemplified, for example, by "RHEODOL (trade name) TW-O106V (polyoxyethylene sorbitan monooleate), "RHEODOL (trade name) TW-L120 (polyoxyethylene sorbitan monolaurate), "RHEODOL (trade name) TW-IS399C (polyoxyethylene sorbitan triisostearate), etc., which are produced by KAO CORPORATION.

The sorbit-based surfactant is exemplified, for example, by a surfactant represented by the following formula (5), etc.

[Formula 5]

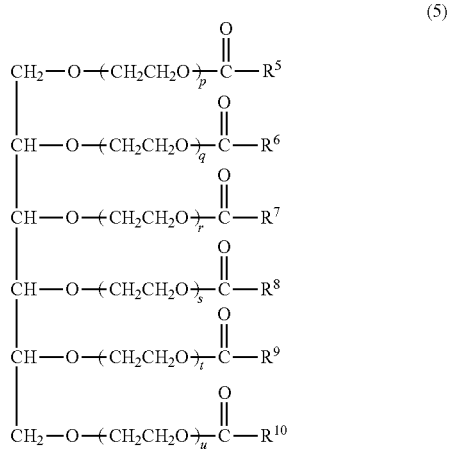

(5)

In the formula (5), each of $R^5$ to $R^{10}$ is a hydrogen atom or an alkyl group of which carbon atom number is 18; and "p", "q", "r", "s", "t" and "u" may be identical to one another or different from one another, and are numbers satisfying: $30 \leq p+q+r+s+t+u \leq 80$.

It is allowable to use, for example, any commercially available product as the sorbit-based surfactant. The commercially available product is exemplified, for example, by "SORBON (trade name) TR-843" (polyoxyethylene sorbitol tetraoleate), produced by TOHO CHEMICAL INDUSTRY CO., LTD., etc.

It is allowable that only one kind of the surfactant is used singly, or that two or more kinds of the surfactant are used in a mixed manner. The blending amount of the surfactant in the entire amount of the water-based ink is, for example, in a range of 0.1% by weight to 3% by weight, preferably in a range of 0.2% by weight to 2% by weight, and more preferably in a range of 0.4% by weight to 1.5% by weight.

In the water-based ink of the present teaching, the specific water-insoluble liquid may be dispersed in the water by using a substance different from the surfactant. For example, in the water-based ink of the present teaching, it is allowable to disperse the specific water-insoluble liquid in the water by allowing fine particles such as silica or a highly polymerized compound to intervene between the surface of the specific water-insoluble liquid and the water. Alternatively, it is allowable to disperse the specific water-insoluble liquid in the water by using any physical method currently available, without using any additive. Further alternatively, if any specific water-insoluble liquid that is self-dispersible (self-emulsifying) is available, such a specific water-insoluble and self-dispersible (self-emulsifying) liquid can be used.

The water-based ink of the present teaching preferably further contains a water-soluble organic solvent. The water-soluble organic solvent is exemplified, for example, by a humectant which prevents the water-based ink from drying at an end of a nozzle in an ink-jet head.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane; 2-pyrrolidone; N-methyl-2-pyrrolidone; and 1,3-dimethyl-2-imidazolidinone; and the like. The polyalkylene glycol is exemplified, for example, by polyethylene glycol, polypropylene glycol which is water-soluble and which has a low molecular weight (not more than 200), etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, it is preferable to use polyvalent alcohols such as alkylene glycol, glycerol, etc. Note that these humectants used in water-based ink are normally water-soluble.

The blending amount of the humectant in the entire amount of the water-based ink is, for example, in a range of 0% by weight to 95% by weight, preferably in a range of 5% by weight to 80% by weight, and more preferably in a range of 5% by weight to 50% by weight.

The water-based ink may further contain a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

Next, a method for producing the water-based ink for ink jet recording of the present teaching will be explained with an example. Note that, however, the producing method is merely an example, and that the water-based ink of the present teaching may be produced in any method.

[Step of Preparing First Liquid]

At first, the water (half of the blending amount) and a material (a water-soluble colorant, etc.) for the water-based ink, which is different from the water, the surfactant and the specific water-insoluble liquid, are mixed and agitated uniformly with a conventionally known method so as to prepare a first liquid.

[Step of Preparing Second Liquid]

Next, the water (remaining half of the blending amount), the surfactant and the specific water-insoluble liquid are mixed and agitated uniformly with a conventionally known method so as to prepare a second liquid. The mixing and agitation in this step is preferably performed for not less than 30 minutes.

[Step of Preparing Water-Based Ink]

Subsequently, the first liquid and the second liquid are mixed and agitated uniformly with a conventionally known method, and thus a water-based ink of the present teaching can be prepared.

The production method may further includes a filtration step for performing filtration after the step of preparing the water-based ink so as to remove any undissolved matter from the water-based ink with a filter.

It is possible to produce an ink cartridge by accommodating the water-based ink of the present teaching in an ink case. It is allowable to use any known ink case (body for ink cartridge) as the ink case (body) of the ink cartridge.

Next, an ink jet recording apparatus and an ink-jet recording method of the present teaching will be explained.

The ink-jet recording apparatus of the present teaching is an ink-jet recording apparatus including an ink-accommodating section and an ink discharge mechanism, wherein an ink accommodated in the ink accommodating section is discharged by the ink discharge mechanism. The water-based ink of the present teaching is accommodated in the ink accommodating section. The ink accommodating section may be an exchangeable ink cartridge, as described above.

The ink-jet recording method of the present teaching is an ink jet recording method for performing recording on a recording medium by discharging a water-based ink by the ink-jet system. The water-based ink for ink-jet recording of the present teaching may be used as the water-based ink.

The ink-jet recording method of the present teaching can be practiced by, for example, using the ink-jet recording apparatus of the present teaching. The recording includes printing text (character, letter), printing image or picture, and printing, etc.

Figure 2:
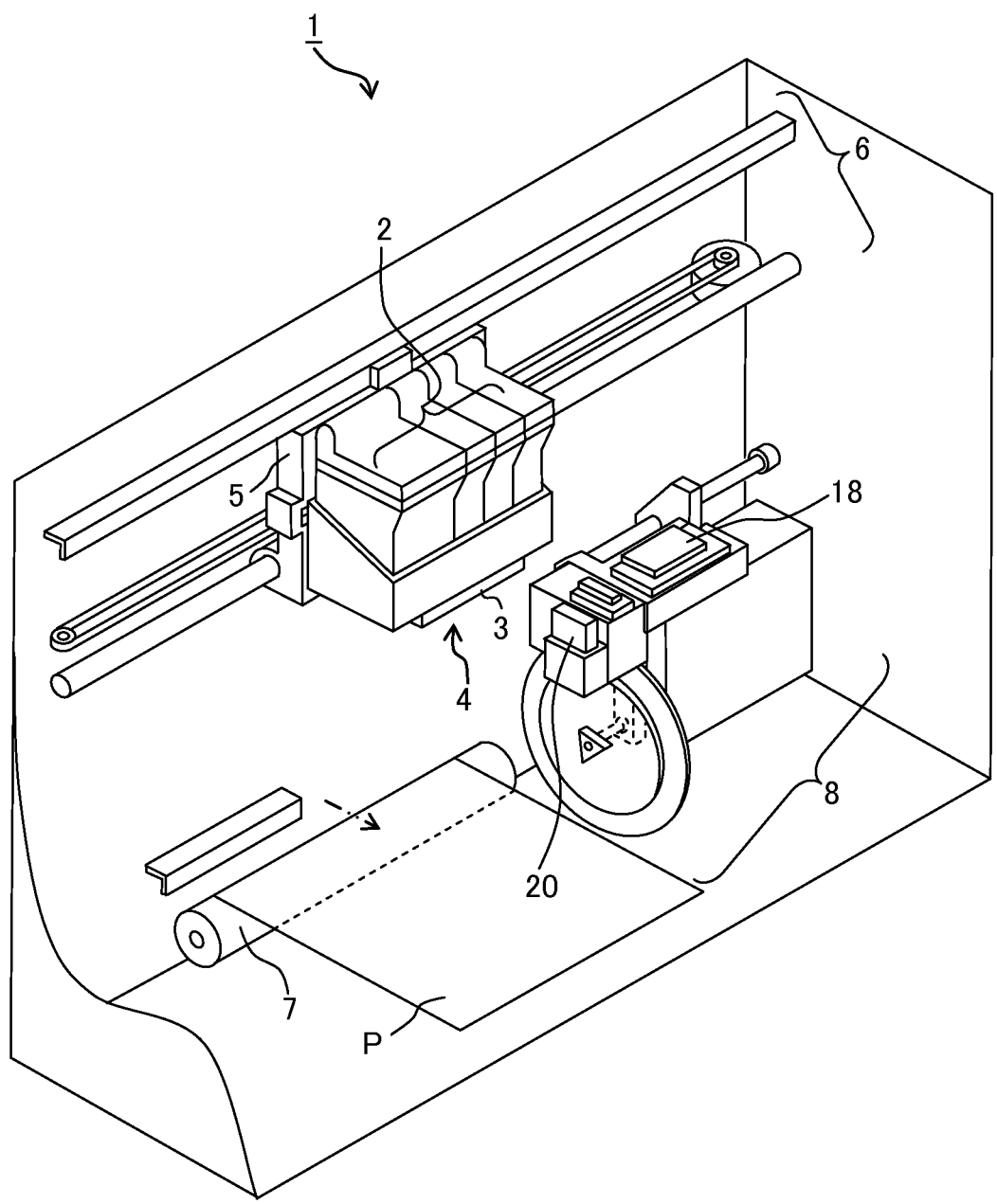
FIG. 2 is a schematic perspective view depicting the construction of an example of an ink-jet recording apparatus of the present teaching.

FIG. 2 depicts the configuration of an example of the ink jet recording apparatus of the present teaching. As depicted in FIG. 2, an ink jet recording apparatus 1 includes four ink cartridges 2, an ink discharge mechanism (ink-jet head) 3, a head unit 4, a carriage 5, a driving unit 6, a platen roller 7 and a purge device 8 as main constitutive components or parts.

The four ink cartridges 2 contain four colors of water-based inks respectively, the four colors being yellow, magenta, cyan and black. For example, at least one of the water-based yellow ink, the water-based magenta ink and the water-based cyan ink is the water-based ink for ink jet recording of the present teaching. It is allowable to use general or commercially available water inks as the remaining inks other than the at least one water-based ink for ink jet recording of the present teaching. The ink-jet head 3 disposed on the head unit 4 performs recording on a recording medium P (for example, a recording paper or recording paper sheet P). The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821). The platen roller 7 extends in the reciprocating direction of the carriage 5 and is arranged to face or be opposite to the ink jet head 3.

The purge device 8 sucks any unsatisfactory ink which contains air bubbles, etc. accumulated in the ink-jet head 3. As the purge device 8, it is possible to use, for example, a conventionally known purge device (for example, see Japanese Patent Application Laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of the recording, so as to prevent the water-based ink from drying.

In the ink-jet recording apparatus 1 of this example, the four ink cartridges 2 are provided, together with the head unit 4, on one carriage 5. Note that, however, the present teaching is not limited to this. In the ink-jet recording apparatus 1, each of the four ink cartridges 2 may be provided on another carriage which is different from that for the head unit 4. Alternatively, each of the four ink cartridges 2 may be arranged and fixed inside the ink-jet recording apparatus 1, rather than being provided on the carriage 5. In these aspects, for example, each of the four ink cartridges 2 and the head unit 4 which is provided on the carriage 5 are connected with a tube, etc., and each of the water-based inks is supplied from one of the four ink cartridges 2 to the head unit 4 via the tube.

An ink jet recording using the ink jet recording apparatus 1 is performed, for example, in the following manner. At first, a recording paper P is supplied or fed, for example, from a paper feeding cassette (not depicted in the drawings) arranged at a side of or at a position below the ink-jet recording apparatus 1. The recording paper P is introduced or guided between the ink jet head 3 and the platen roller 7. Then, a predetermined recording is performed on the fed or introduced recording paper P with the water-based inks discharged from the ink-jet head 3. Since the odor is reduced in the water-based ink of the present teaching and the increase in viscosity is suppressed in the water-based ink of the present teaching, the water-based ink has an excellent discharge property. The recording paper P on which the recording has been performed is discharged from the ink-jet recording apparatus 1. A recorded matter recorded with the water-based ink of the present teaching has an excellent drying property and any unevenness is suppressed in the recorded matter. In FIG. 2, the paper feeding mechanism and discharging mechanism for the recording paper P are omitted.

Although the apparatus depicted in FIG. 2 adopts an ink-jet head of the serial type, the present teaching is not limited to this. The ink-jet recording apparatus may be an apparatus adopting an ink-jet head of the line type.

EXAMPLES

Next, examples of the present teaching will be explained together with comparative examples. Note that the present teaching is not limited to and is not restricted by the examples and the comparative examples which will be described below.

Examples 1-10 and Comparative Examples 1-6

A water-soluble colorant, water (half the amount indicated in TABLE 2 as follows) and a humectant in Water-based Ink Composition (TABLE 2) were mixed and agitated uniformly or homogeneously; and thus the first liquid was prepared. Subsequently, the water (remaining half the amount indicated in TABLE 2), a surfactant, and a water-insoluble liquid or a water-soluble liquid in the Water-based Ink Composition (TABLE 2) were mixed and agitated uniformly; and thus the second liquid was prepared. Next, the first liquid and the second liquid were mixed and agitated uniformly, and thus water-based inks of Examples 1 to 10 and Comparative Examples 1 to 6 were obtained.

With respect to the water-based inks of Examples 1 to 10 and Comparative Examples 1 to 6, (a) measurement of viscosity, (b) evaluation of drying property, (c) evaluation of unevenness and (d) evaluation of odor were performed by the following methods.

(a) Measurement of Viscosity

The viscosity of the water-based inks of Examples 1 to 10 and Comparative Examples 1 to 6 were measured by using a viscometer (model name: "TVE-25", manufactured by TOKI SANGYO CO., LTD. under a condition of measurement temperature: 25 degrees Celsius.

(b) Evaluation of Drying Property

An ink jet printer "MFC-J4510N", manufactured by BROTHER KOGYO KABUSHIKI KAISHA was used to record an image including a single-color patch on plain papers 1 to 4, with a resolution of 600 dpi×300 dpi, by using each of the water-based inks of Examples 1 to 10 and Comparative Examples 1 to 6. Regarding each of the images recorded with one of the water-based inks of Examples 1 to 10 and Comparative Examples 1 to 6, the single color patch was rubbed by a cotton swab after 5 seconds, 10 second, 15 seconds and 30 seconds elapsed from the recording, and the drying property was evaluated in accordance with the following evaluation criterion. As the plain paper 1, "My Paper" (trade name) produced by RICOH COMPANY LTD., was used; as the plain paper 2, "Office Paper W" (trade name) produced by FUJITSU COWORCO LIMITED was used; as the plain paper 3, "Rey Copy Paper" (trade name) produced by INTERNATIONAL PAPER was used; and as the plain paper 4, "Business" (trade name) produced by XEROX CORPORATION was used.

[Evaluation Criterion for Drying Property]
(For Each of the Plain Papers 1 to 4)
A: The single-color patch was dried in less than 5 seconds since the recording.
B: The single-color patch was dried within a period of 5 seconds to 15 seconds since the recording.
C: The single-color patch was dried within a period which is more than 15 seconds and not more than 30 seconds since the recording
(Overall Evaluation)
G: The result of evaluation was "A" for all of the plain papers 1 to 4.
NG: The result of evaluation was "B" or "C" for any one of the plain papers 1 to 4.
(c) Evaluation of Unevenness
Regarding the unevenness of the single color patch prepared in a similar manner as in the evaluation of drying property, evaluation was made by visually determining whether the single color patch in each of the plain papers 1 to 4 was most similar to which one of three kinds of criteria samples prepared in advance and identified as "A", "B" and "C" in a descending order of satisfaction, and the unevenness in each of the plain papers 1 to 4 was evaluated. In addition, the overall evaluation of the unevenness was performed in accordance with the following evaluation criterion.

Evaluation Criterion for Overall Evaluation of Unevenness
G: The evaluation result was "A" or "B" for all of the plain papers 1 to 4.
NG: The evaluation result was "C" for any one of the plain papers 1 to 4.
(d) Evaluation of Odor
Took a smell of each of Examples 1 to 10 and Comparative Examples 1 to 6 to confirm whether or not there was any odor. If there was no odor, it was judged "G" (passed); if there was any odor, it was judged "NG" (failed).

The compositions of the water-based inks of Examples 1 to 10 and Comparative Examples 1 to 6 and the results of measurement and evaluation are indicated in TABLE 2 as follows.

TABLE 2

Legend—(Following)

*1: polyoxyethylene sorbitan monooleate, produced by KAO CORPORATION
*2: polyoxyethylene oleyl ether, produced by KAO CORPORATION
*3: polyoxyethylene sorbitol tetraoleate, produced by TOHO CHEMICAL INDUSTRY CO., LTD.
*4: "My Paper" (trade name), produced by RICOH COMPANY LTD.
*5: "Office Paper W" (trade name) produced by FUJITSU COWORCO LIMITED
*6: "Rey Copy Paper" (trade name), produced by INTERNATIONAL PAPER
*7: "Business" (trade name) produced by XEROX CORPORATION

TABLE 2

| | | | | | | EXAMPLES | | | | |
| --- | --- | --- | --- | --- | --- | --- | --- | --- | --- | --- |
| | | | | | 1 | 2 | 3 | 4 | 5 | 6 |
| Composition of water-based ink (% by weight) | Water-soluble colorant | C.I. Acid Red 52 | | | 0.50 | 0.50 | 0.50 | 0.50 | 0.50 | 0.50 |
| | | C.I. Acid Blue 90 | | | — | — | — | — | — | — |
| | | | boiling | surface | | | | | | |
| | Water-insoluble liquid | Diethyl adipate | 251° C. | 32 mN/m | 4.00 | 4.00 | — | — | 1.00 | 2.00 |
| | | Diethyl phthalate | 296° C. | 38 mN/m | — | — | 4.00 | — | — | — |
| | | PPG 400 | 273° C. | 33 mN/m | — | — | — | 4.00 | — | — |
| | | Dodecane | 215° C. | 25 mN/m | — | — | — | — | — | — |
| | | Liquid paraffin | 300° C. | 25 mN/m | — | — | — | — | — | — |
| | Water-soluble liquid | DPP | 212° C. | — | — | — | — | — | — | — |
| | | Polyethylene glycol 200 | 314° C. | — | — | — | — | — | — | — |
| | Surfactant | RHEODOL (trade name) TW-O106V (*1) | | | 0.40 | — | 0.40 | — | 0.40 | 0.40 |
| | | EMULGEN (trade name) 408 (*2) | | | — | — | — | 0.40 | — | — |
| | | SORBON (trade name) TR-843 (*3) | | | — | 0.40 | — | — | — | — |
| | Humectant | 85% Glycerol | | | 40.00 | 40.00 | 40.00 | 40.00 | 40.00 | 40.00 |
| | Water | | | | 55.10 | 55.10 | 55.10 | 55.10 | 58.10 | 57.10 |
| Viscosity (mPa · s) | | | | | 3.05 | 2.88 | 3.01 | 3.58 | 2.71 | 2.77 |
| Drying property | Plain paper 1 (*4) | | | | A | A | A | A | A | A |
| | Plain paper 2 (*5) | | | | A | A | A | A | A | A |
| | Plain paper 3 (*6) | | | | A | A | A | A | A | A |
| | Plain paper 4 (*7) | | | | A | A | A | A | A | A |
| | Overall Evaluation | | | | G | G | G | G | G | G |
| Unevenness | Plain paper 1 (*4) | | | | A | A | A | A | A | A |
| | Plain paper 2 (*5) | | | | B | B | B | A | B | B |
| | Plain paper 3 (*6) | | | | B | B | B | A | B | B |
| | Plain paper 4 (*7) | | | | B | B | B | A | B | B |
| | Overall Evaluation | | | | G | G | G | G | G | G |
| Odor | | | | | G | G | G | G | G | G |

TABLE 2-continued

|  |  |  |  |  | EXAMPLES | | | |
|---|---|---|---|---|---|---|---|---|
|  |  |  |  |  | 7 | 8 | 9 | 10 |
| Composition of water-based ink (% by weight) | Water-soluble colorant | C.I. Acid Red 52 |  |  | 0.50 | 0.50 | 2.00 | — |
|  |  | C.I. Acid Blue 90 |  |  | — | — | — | 4.00 |
|  |  |  | boiling | surface |  |  |  |  |
|  | Water-insoluble liquid | Diethyl adipate | 251° C. | 32 mN/m | 10.00 | 15.00 | 4.00 | 4.00 |
|  |  | Diethyl phthalate | 296° C. | 38 mN/m | — | — | — | — |
|  |  | PPG 400 | 273° C. | 33 mN/m | — | — | — | — |
|  |  | Dodecane | 215° C. | 25 mN/m | — | — | — | — |
|  |  | Liquid paraffin | 300° C. | 25 mN/m | — | — | — | — |
|  | Water-soluble liquid | DPP | 212° C. |  | — | — | — | — |
|  |  | Polyethylene glycol 200 | 314° C. |  | — | — | — | — |
|  | Surfactant | RHEODOL (trade name) TW-O106V (*1) |  |  | 1.00 | 1.50 | 0.40 | 0.40 |
|  |  | EMULGEN (trade name) 408 (*2) |  |  | — | — | — | — |
|  |  | SORBON (trade name) TR-843 (*3) |  |  | — | — | — | — |
|  | Humectant | 85% Glycerol |  |  | 40.00 | 40.00 | 40.00 | 40.00 |
|  | Water |  |  |  | 48.50 | 43.00 | 53.60 | 51.60 |
| Viscosity (mPa·s) |  |  |  |  | 4.28 | 5.64 | 3.29 | 4.28 |
| Drying property | Plain paper 1 (*4) |  |  |  | A | A | A | A |
|  | Plain paper 2 (*5) |  |  |  | A | A | A | A |
|  | Plain paper 3 (*6) |  |  |  | A | A | A | A |
|  | Plain paper 4 (*7) |  |  |  | A | A | A | A |
|  | Overall Evaluation |  |  |  | G | G | G | G |
| Unevenness | Plain paper 1 (*4) |  |  |  | A | A | A | A |
|  | Plain paper 2 (*5) |  |  |  | B | B | B | B |
|  | Plain paper 3 (*6) |  |  |  | A | A | B | B |
|  | Plain paper 4 (*7) |  |  |  | A | A | A | B |
|  | Overall Evaluation |  |  |  | G | G | G | G |
| Odor |  |  |  |  | G | G | G | G |

|  |  |  |  |  | COMPARATIVE EXAMPLES | | | | | |
|---|---|---|---|---|---|---|---|---|---|---|
|  |  |  |  |  | 1 | 2 | 3 | 4 | 5 | 6 |
| Composition of water-based ink (% by weight) | Water-soluble colorant | C.I. Acid Red 52 |  |  | 0.50 | 0.50 | 0.50 | 0.50 | 0.50 | 0.50 |
|  |  | C.I. Acid Blue 90 |  |  | — | — | — | — | — | — |
|  |  |  | boiling | surface |  |  |  |  |  |  |
|  | Water-insoluble liquid | Diethyl adipate | 251° C. | 32 mN/m | — | — | — | — | — | — |
|  |  | Diethyl phthalate | 296° C. | 38 mN/m | — | — | — | — | — | — |
|  |  | PPG 400 | 273° C. | 33 mN/m | — | — | — | — | — | — |
|  |  | Dodecane | 215° C. | 25 mN/m | — | — | — | — | 4.00 | — |
|  |  | Liquid paraffin | 300° C. | 25 mN/m | — | — | — | — | — | 4.00 |
|  | Water-soluble liquid | DPP | 212° C. |  | — | 4.00 | — | — | — | — |
|  |  | Polyethylene glycol 200 | 314° C. |  | — | — | 4.00 | 10.00 | — | — |
|  | Surfactant | RHEODOL (trade name) TW-O106V (*1) |  |  | 0.40 | 0.40 | 0.40 | 0.40 | — | — |
|  |  | EMULGEN (trade name) 408 (*2) |  |  | — | — | — | — | — | — |
|  |  | SORBON (trade name) TR-843 (*3) |  |  | — | — | — | — | 0.40 | 0.40 |
|  | Humectant | 85% Glycerol |  |  | 40.00 | 40.00 | 40.00 | 40.00 | 40.00 | 40.00 |
|  | Water |  |  |  | 59.10 | 55.10 | 55.10 | 49.10 | 55.10 | 55.10 |
| Viscosity (mPa·s) |  |  |  |  | 2.77 | 3.27 | 3.26 | 4.31 | 2.89 | Water-based ink could not be prepared |
| Drying property | Plain paper 1 (*4) |  |  |  | B | A | B | A | B |  |
|  | Plain paper 2 (*5) |  |  |  | B | A | C | B | B |  |
|  | Plain paper 3 (*6) |  |  |  | A | A | A | A | A |  |
|  | Plain paper 4 (*7) |  |  |  | A | A | A | A | A |  |
|  | Overall Evaluation |  |  |  | NG | G | NG | NG | NG |  |
| Unevenness | Plain paper 1 (*4) |  |  |  | C | A | C | C | B |  |
|  | Plain paper 2 (*5) |  |  |  | C | A | C | C | C |  |
|  | Plain paper 3 (*6) |  |  |  | C | A | C | B | C |  |
|  | Plain paper 4 (*7) |  |  |  | C | A | C | B | C |  |
|  | Overall Evaluation |  |  |  | NG | G | NG | NG | NG |  |
| Odor |  |  |  |  | G | NG | G | G | G |  |

As indicated in TABLE 2, the water-based inks of Examples 1 to 10 had excellent results in all of the evaluations of drying property, unevenness and odor. Further, in Examples 1 to 10, the viscosity was not more than 5.7 mPa·s, and the increase in viscosity was also suppressed. In particular, Examples 4 using the PPG 400 having the polypropylene glycol structure as the specific water-insoluble liquid had quite excellent result in the evaluation of unevenness. Furthermore, Examples 1-7, 9 and 10 in each of which the ratio of the specific water-insoluble liquid was in a range of 1% by weight to 10% by weight had the viscosity of not more than 4.3 mPa·s, and the increase in viscosity was further suppressed. Moreover, Examples 7 and 8 in each of which the ratio of the specific water-insoluble liquid was in a range of 10% by weight to 15% by weight had the results of evaluation of unevenness that were more satisfactory than those of the remaining examples.

On the other hand, Comparative Example 1 which did not use the specific water-insoluble liquid had unsatisfactory results in the evaluations of drying property and unevenness. Further, Comparative Example 2 which used DPP as a water-soluble liquid, rather than using the specific water-insoluble liquid, had an unsatisfactory result in the evaluation of odor. Furthermore, Comparative Examples 3 and 4 which used polyethylene glycol 200 as a water-soluble liquid, rather than using the specific water-insoluble liquid, had an unsatisfactory results in the evaluations of drying property and unevenness. Moreover, Comparative Example 5 which used dodecane as a water-insoluble liquid of which boiling point was less than 250 degrees Celsius, rather than using the specific water-insoluble liquid, had also unsatisfactory results in the evaluations of drying property and unevenness. Further, in Comparative Example 6 using liquid paraffin as a water-insoluble liquid, rather than using the specific water-insoluble liquid, it was not possible to allow the liquid paraffin to be present in the water in the dispersed state in the water, and thus the water-based ink could not be prepared.

As described above, the water-based ink of the present teaching is capable of achieving both the increase of drying property and the decrease of odor. The usage of the water-based ink of the present teaching is not particularly limited, and is widely applicable to a variety of kinds of ink-jet recording.

What is claimed is:

1. A water-based ink for ink-jet recording comprising:
    a water-soluble colorant;
    water;
    a water-insoluble liquid which is dispersed in the water and of which boiling point is not less than 250 degrees Celsius; and
    a surfactant selected from the group consisting of a polyoxyalkylene alkyl ether-based surfactant, a sorbitan-based surfactant, a sorbit-based surfactant, and a combination thereof, wherein the water-insoluble liquid is dispersed in the liquid by the surfactant.

2. The water-based ink for ink-jet recording according to claim 1, wherein surface tension of the water-insoluble liquid is not less than 30 mN/m.

3. The water-based ink for ink-jet recording according to claim 2, wherein the surface tension of the water-insoluble liquid is in a range of 30 mN/m to 60 mN/m.

4. The water-based ink for ink-jet recording according to claim 1, wherein the water-insoluble liquid has a polypropylene glycol structure.

5. The water-based ink for ink-jet recording according to claim 1, wherein the water-insoluble liquid is one selected from the group consisting of polypropylene glycol, diethyl adipate and diethyl phthalate.

6. The water-based ink for ink-jet recording according to claim 1, wherein a blending amount of the water-insoluble liquid in an entire amount of the water-based ink is in a range of 1% by weight to 10% by weight.

7. The water-based ink for ink-jet recording according to claim 1, wherein a blending amount of the water-insoluble liquid in an entire amount of the water-based ink is in a range of 10% by weight to 15% by weight.

8. An ink cartridge configured to contain a water-based ink for ink-jet recording, wherein the water-based ink is the water-based ink for ink-jet recording as defined in claim 1.

9. A method for producing a water-based ink for ink-jet recording, the method comprising:
    a first liquid preparation step of preparing a first liquid by mixing and agitating a water-soluble colorant and water;
    a second liquid preparation step of preparing a second liquid by mixing and agitating the water, a surfactant, and a water-insoluble liquid of which boiling point is not less than 250 degrees Celsius, wherein the surfactant is selected from the group consisting of a polyoxyalkylene alkyl ether-based surfactant, a sorbitan-based surfactant, a sorbit-based surfactant, and a combination thereof; and
    a water-based ink preparation step of preparing the water-based ink for ink-jet recording by mixing and agitating the first liquid and the second liquid.

10. The method for producing the water-based ink for ink-jet recording according to claim 9, wherein surface tension of the water-insoluble liquid is in a range of 30 mN/m to 60 mN/m.

11. The method for producing the water-based ink for ink-jet recording according to claim 9, wherein the water-insoluble liquid has a polypropylene glycol structure.

12. The method for producing the water-based ink for ink-jet recording according to claim 9, wherein the water-insoluble liquid is one selected from the group consisting of polypropylene glycol, diethyl adipate and diethyl phthalate.

13. The method for producing the water-based ink for ink-jet recording according to claim 9, wherein a blending amount of the water-insoluble liquid in an entire amount of the water-based ink is in a range of 1% by weight to 10% by weight.

14. The method for producing the water-based ink for ink-jet recording according to claim 9, wherein a blending amount of the water-insoluble liquid in an entire amount of the water-based ink is in a range of 10% by weight to 15% by weight.

* * * * *